(12) United States Patent
Lin et al.

(10) Patent No.: US 9,513,529 B2
(45) Date of Patent: Dec. 6, 2016

(54) DISPLAY APPARATUS INCLUDING MEMS DEVICES

(71) Applicant: Intel Corporation, Santa Clara, CA (US)

(72) Inventors: Kevin Lin, Beaverton, OR (US); Nathan R. Andrysco, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 179 days.

(21) Appl. No.: 14/128,926

(22) PCT Filed: Aug. 20, 2013

(86) PCT No.: PCT/US2013/055843
§ 371 (c)(1),
(2) Date: Dec. 23, 2013

(87) PCT Pub. No.: WO2015/026333
PCT Pub. Date: Feb. 26, 2015

(65) Prior Publication Data
US 2015/0234251 A1     Aug. 20, 2015

(51) Int. Cl.
*G02F 1/03* (2006.01)
*G02F 1/07* (2006.01)
*G02F 1/19* (2006.01)

(52) U.S. Cl.
CPC ...................................... *G02F 1/19* (2013.01)

(58) Field of Classification Search
CPC .... G02B 26/001; G02B 26/02; G02B 26/00; G02B 26/0833; G02B 5/28; G02B 5/284; G02B 5/26; G02B 6/29358; G02B 6/29395; G02B 6/3584; G02B 6/2813; G02B 6/29361; G02B 6/355; G02B 6/357; G01J 3/26; G09G 3/3466; G09G 2300/0426; G09G 5/02; B81B 2201/047; B81B 2203/058; G02F 1/19; G02F 1/3136; G02F 2001/217; G02F 2203/48; H01L 31/02165; H02N 1/006; H04J 14/00

USPC ....... 359/578, 290, 589, 291, 260, 577, 579, 359/263; 250/226; 356/450, 419, 454; 310/309; 372/20, 92

See application file for complete search history.

(56) References Cited

U.S. PATENT DOCUMENTS

| | | | |
|---|---|---|---|
| 6,600,591 B2 | 7/2003 | Anderson et al. | |
| 8,008,736 B2 | 8/2011 | Kothari | |
| 8,319,169 B2 * | 11/2012 | Funasaka | G02B 5/28 250/216 |

(Continued)

FOREIGN PATENT DOCUMENTS

| | | |
|---|---|---|
| JP | 2005142982 A | 6/2005 |
| KR | 20060009119 A | 1/2006 |

OTHER PUBLICATIONS

International Search Report and Written Opinion for PCT Application No. PCT/US2013/055843, Dated May 21, 2014.

(Continued)

*Primary Examiner* — Bumsuk Won
*Assistant Examiner* — Collin X Beatty
(74) *Attorney, Agent, or Firm* — Schwabe, Williamson & Wyatt, P.C.

(57) ABSTRACT

Embodiments of the present disclosure provide techniques and configurations for a display apparatus. In one embodiment, the apparatus may include one or more micro-electromechanical system (MEMS) devices. The MEMS device may include a first electrode including a partially reflective surface, a second electrode including a partially or completely reflective surface and disposed substantially parallel to the first electrode, and an analog actuation arrangement coupled to the first electrode, the second electrode or both the first and second electrodes to cause movement of the first electrode from a start position to a selected position of a plurality of end positions, responsive to a selected application of an actuation voltage, to cause the MEMS device to selectively output a reflection of a light in a selected wavelength, or no reflection of the light. Other embodiments may be described and/or claimed.

20 Claims, 9 Drawing Sheets

(56) References Cited

U.S. PATENT DOCUMENTS

| | | | |
|---|---|---|---|
| 8,917,449 B2* | 12/2014 | Sano | G02B 6/29361 359/577 |
| 2003/0052569 A1 | 3/2003 | Dhuler et al. | |
| 2003/0123125 A1* | 7/2003 | Little | B81C 99/008 359/290 |
| 2004/0090141 A1* | 5/2004 | Chi | H02N 1/006 310/309 |
| 2008/0075414 A1* | 3/2008 | Van Ostrand | G09G 3/3473 385/146 |
| 2009/0257113 A1* | 10/2009 | Smith | G02B 26/001 359/321 |
| 2010/0182608 A1* | 7/2010 | Zribi | G01J 3/06 356/454 |
| 2011/0235154 A1* | 9/2011 | Ji | G02B 5/284 359/290 |
| 2012/0013905 A1* | 1/2012 | Nozawa | G01J 3/26 356/326 |
| 2012/0044492 A1* | 2/2012 | Matsushita | G01J 3/26 356/326 |
| 2012/0044562 A1* | 2/2012 | Hong | G02B 26/001 359/290 |
| 2012/0120402 A1* | 5/2012 | Hirokubo | G01J 3/26 356/450 |
| 2013/0114083 A1* | 5/2013 | Sano | G02B 26/001 356/416 |
| 2013/0135326 A1* | 5/2013 | Govil | G09G 3/3466 345/520 |
| 2014/0036343 A1* | 2/2014 | Ma | G02B 26/001 359/291 |

OTHER PUBLICATIONS

International Preliminary Report on Patentability mailed Mar. 3, 2016 for International Application No. PCT/US2013/055843, 9 pages.

\* cited by examiner

DISPLAY APPARATUS INCLUDING MEMS DEVICES

CROSS REFERENCE TO RELATED APPLICATION

The present application is a national phase entry under 35 U.S.C. §371 of International Application No. PCT/US2013/055843, filed Aug. 20, 2013, entitled "A DISPLAY APPARATUS INCLUDING MEMS DEVICES," which designates, among the various States, the United States of America, and the entire contents and disclosures of which are hereby incorporated by reference in their entireties.

FIELD

Embodiments of the present disclosure generally relate to the field of opto-electronics, and more particularly, to using micro-electro-mechanical system (MEMS) devices in interferometric modulator displays.

BACKGROUND

Electronic visual display technologies, such as interferometric modulator displays (IMODs) use constructive and destructive interference to reflect selective wavelengths of light. In some instances, each pixel included in a display may be composed of a MEMS-like device with a top and bottom reflector that have a bi-stable configuration. In the on-state, the distance between the top and bottom electrode of the reflector is such that the pixel may reflect either a red, blue, or green wavelength of light. In the off-state, the pixel may not reflect any light in the visible spectrum. This display technology may provide for visibility in high ambient light conditions and low-power operation, since no backlight is needed for and the display may maintain its state without periodic refreshing.

However, low-power operation and the image reproduction at high fidelity may have some shortcomings. For example, each pixel may be implemented as a binary switch, thus being capable of producing a single color by reflecting a specific wavelength of light, or not reflecting any light. Further, the switch may need to continuously switch (e.g., pulse with modulation) to reproduce colors in the visible spectrum.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for display apparatuses including MEMS devices, such as IMODs.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first feature formed, deposited, or otherwise disposed on a second feature," may mean that the first feature is formed, deposited, or disposed over the second feature, and at least a part of the first feature may be in direct contact (e.g., direct physical and/or electrical contact) or indirect contact (e.g., having one or more other features between the first feature and the second feature) with at least a part of the second feature.

Figure 1:
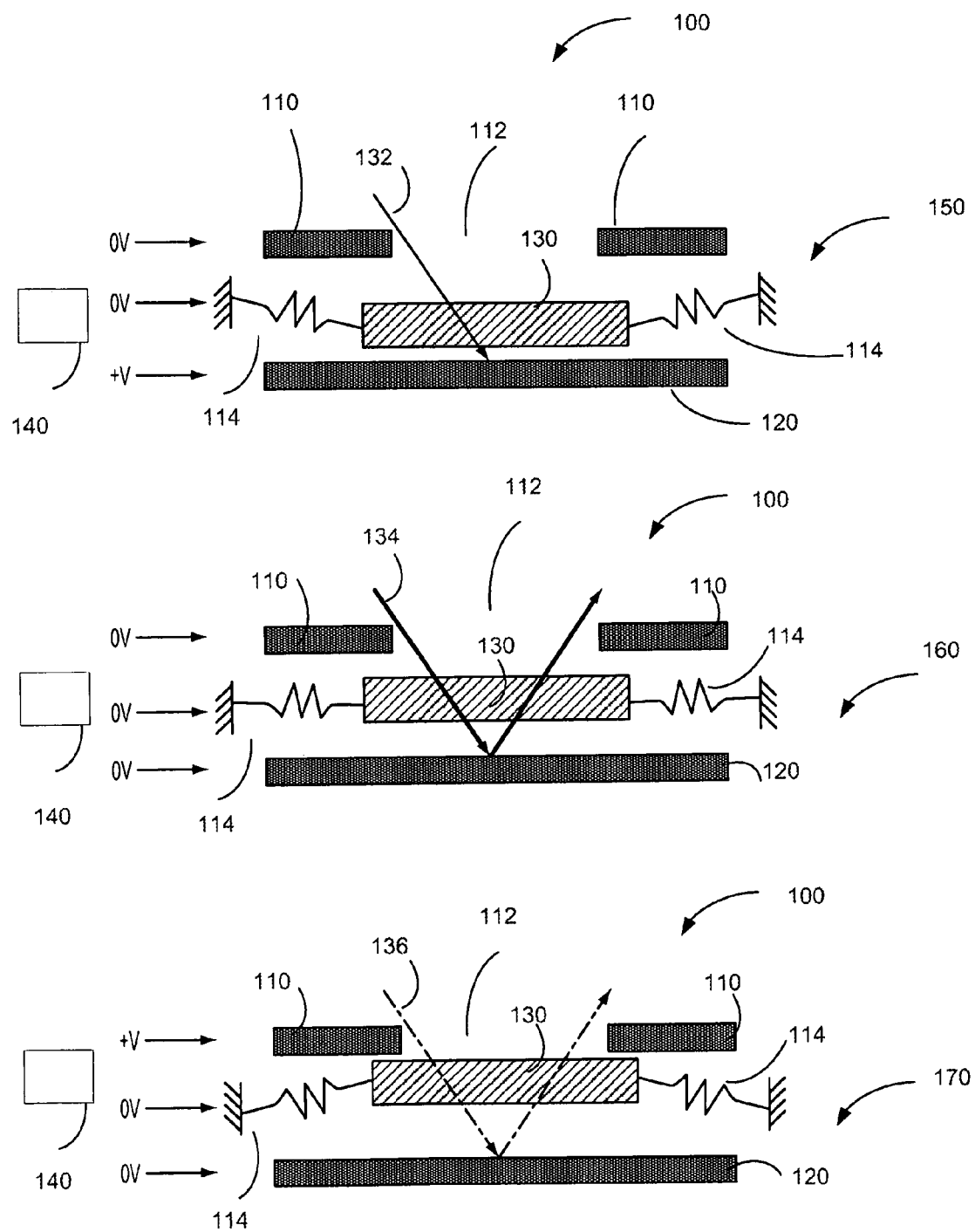
FIG. 1 schematically illustrates an example MEMS device with a tri-stable configuration, in accordance with some embodiments.

FIG. 1 schematically illustrates an example MEMS device 100 with a tri-stable configuration, in accordance with some embodiments. A tri-stable configuration of a MEMS device may allow the device to selectively reproduce lights in one of two colors (e.g., through constructive interference), in addition to an opaque "off" state of the MEMS device 100, where no light in reproduced. FIG. 1 illustrates the MEMS device 100 in three states, indicated by numerals 150, 160, and 170. In embodiments, the MEMS device 100 may include a top electrode 110 having an opening 112, a bottom electrode 120, and a moveable electrode 130 disposed between the electrodes 110 and 120, as shown. In some embodiments, the moveable electrode 130 may be placed (e.g., suspended or affixed) between the electrodes 110 and 120 using an arrangement 114, such as one or more springs, as shown. Actuation voltage may be supplied to the MEMS device by an actuation circuit 140 (not shown in subsequent figures for simplicity purposes). In some embodiments, the moveable electrode 130 may include a partially reflective surface, and the bottom electrode 120 may include a partially or completely reflective surface.

A combination of an electrode with partially reflective surface placed at a distance from another electrode with a partially or completely reflective surface may be similar to a thin film interference system, where a wavelength of the reflected light that a user may see is dependent on the distance between the electrodes. In general, wavelength of light directed at, and partially reflected through constructive interference by, the combination of electrodes placed at a distance within each other, depends on the gap between the electrodes. MEMS devices with such or similar combination of reflective electrodes will be described in different embodiments hereinafter, such as in reference to FIGS. 2-9.

Referring again to FIG. 1, in state 160, no actuation voltage is applied to either electrode 110 or 120, which results in the MEMS device 100 partially reflecting light 134 in a color, e.g., corresponding to a short wavelength. In state 150, actuation voltage may be applied to the bottom electrode 120, turning the MEMS device 100 off, i.e., the light 132 directed at the electrodes 130 and 120 may be completely or approximately fully absorbed. In state 170, actuation voltage may be applied to the top electrode 110, producing partially reflected light resulting from the incoming light 136, having another color (e.g., corresponding to a long wavelength).

Figure 2:
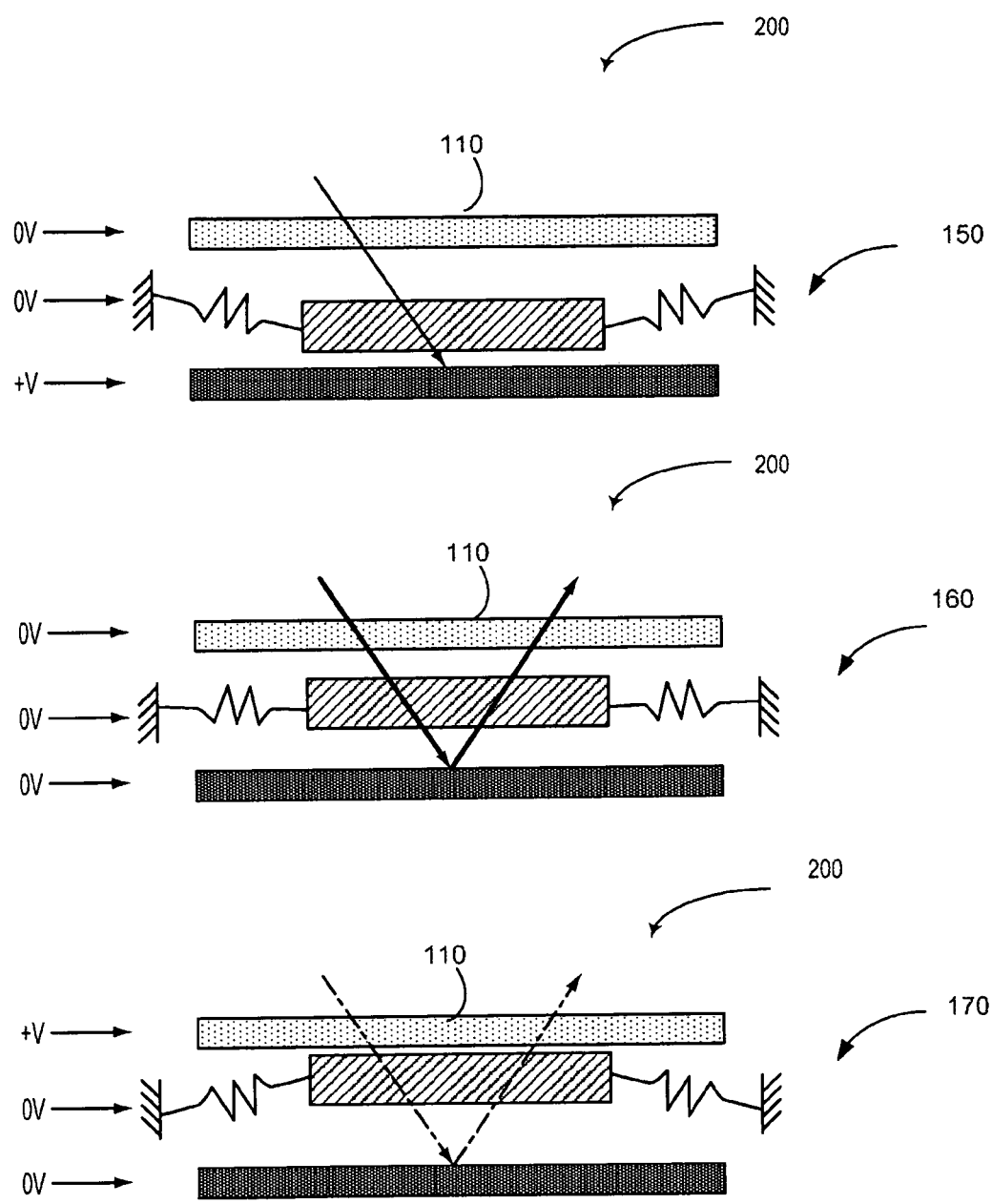
FIG. 2 schematically illustrates another example MEMS device with a tri-stable configuration, in accordance with some embodiments.

FIG. 2 schematically illustrates another example MEMS device 200 with a tri-stable configuration, in accordance with some embodiments. The MEMS device 200 is shown in three states 150, 160, and 170, similar to those described in reference to FIG. 1. The MEMS device 200 may be similar to the device 100 (the like numerals have been omitted for simplicity purposes). In some embodiments, the top electrode 110 may comprise a transparent conductive material (such as indium tin oxide ITO) fabricated on a glass substrate and configured to pass the light through to the electrodes 130 and 120, such that the overall light reflection area may be widened (compared to the opening 112) and not be affected by the electrode dimensions.

In some embodiments, a tri-stable MEMS device 100 (200) may support two color combinations for each pixel comprised by the device, allowing for a vibrant display of color. For example, a traditional IMOD may display a color (e.g., blue), with ⅓ of the pixels displaying the blue color. Using a MEMS device with a tri-stable configuration as described in reference to FIGS. 1 and 2, ⅔ of the pixels may be able to display a blue color, therefore doubling the brightness of the blue as perceived by the user.

In some embodiments, a MEMS device may include an analog configuration. More specifically, an analog actuation technique for applying selectable voltages between electrodes may be utilized to control the gap between the electrodes in a MEMS device similar to ones described above. Because controlling the gap between the electrodes may control the wavelength of constructive interference of light, the analog-configured MEMS device may selectively reflect any wavelength of light in the visible spectrum. The described embodiments may avoid the need for pixels representing different colors (e.g., red, green, and blue pixels), thus reducing the total number of pixels needed to be controlled. The described embodiments may also allow for the user to perceive more vibrant colors as a larger percentage of the screen (compared to e.g., a bi-stable MEMS device configuration) may be reflective.

Figure 3:
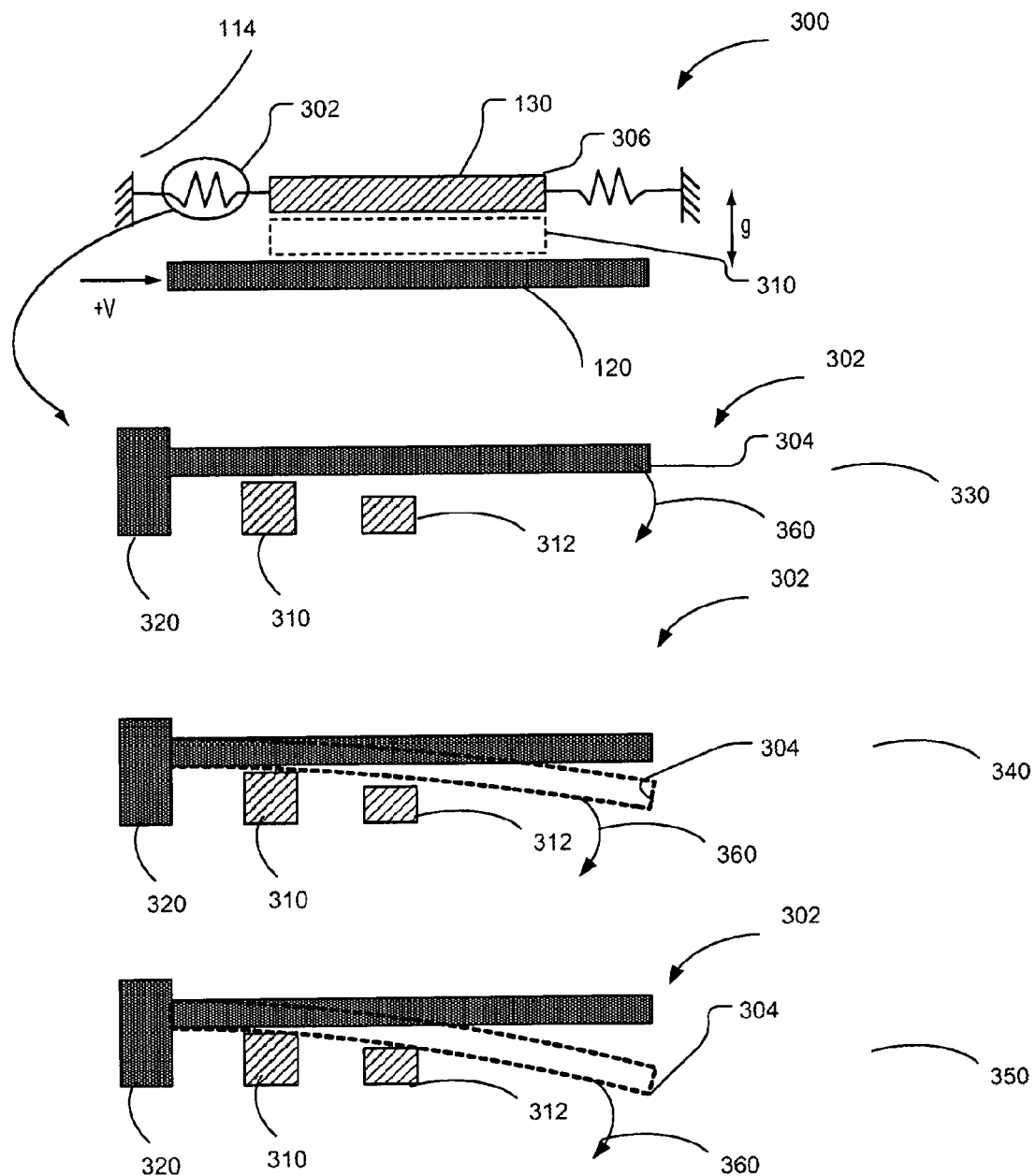
FIG. 3 schematically illustrates an example MEMS device with analog configuration that provides for multi-wavelength light reflection, in accordance with some embodiments.

FIG. 3 schematically illustrates an example MEMS device 300 with analog configuration that provides for multi-wavelength light reflection, in accordance with some embodiments. The MEMS device 300 may include a moveable electrode 130 and an electrode 120 configured similarly to those indicated with like numerals and described above. The device 300 may be coupled with an actuation circuit 140 described in reference to FIG. 1 and configured to selectively apply actuation voltage to the device. More specifically, an analog actuation voltage may be applied to the electrode 120 e.g., within a particular range (e.g., 0 V to 5V), causing movement of the moveable electrode from a start position 306 to a selected end position (e.g., position 310) of a plurality of end positions, responsive to a selected application of the actuation voltage. The MEMS device 300 may be then enabled to selectively output a reflection of a light (not shown) directed at the electrodes 130 and 120 in a selected wavelength, or to output substantially no reflection of the light (i.e., absorb the light). It should be noted that ranges of actuation voltage as applied to the electrodes 120 and 130 may vary depending on implementation and may include positive, negative, or zero voltage.

As discussed in reference to FIG. 1, the moveable electrode 130 may be placed in the MEMS device 300 using an analog actuation arrangement 114, such as one or more springs 302. Two springs are shown in the arrangement 114 for illustration purposes. In a device including the movable electrode 306 connected to the spring 302, the pull-in actuation voltage (voltage bringing the electrode 130 in physical contact with, or near, the electrode 120) may occur when the electrode gap is approximately ⅔ of the initial gap (indicated by "g" in FIG. 3). It may be challenging to actuate the electrode 120 such that all or nearly all colors of the visible spectrum may be represented as a result of the movement of the electrode 130 to respective selected positions. For example, the visible spectrum may correspond to the electrode 130's movement range between 400 nanometers (nm) and 750 nm. Accordingly, the MEMS device 300 may be configured to provide the movement of the electrode within the range corresponding to the visible spectrum, despite the pull-in that may occur before the electrode 130 travels through the visible spectrum range.

The gap between the top and bottom electrodes 130 and 120 of the MEMS device 300 may be determined by a force balance, where the electrostatic force is equal to the spring 302 restoring force. Spring restoring force may be proportionate to the gap distance (according to Hooke's law), and the electrostatic force applied to the electrode 130 that is caused by the actuation voltage applied to the electrode 120 may be inversely proportional to a gap distance.

In some embodiments, the arrangement 114 may be configured to provide the non-linear restoring force supplied by the spring 302 in response to the electrostatic force resulted from the actuation voltage application to the electrode 120 and directed to move the moveable electrode 130 away from the start position. In some embodiments, the spring 302 may be configured such that the restoring force may be calibrated to match the electrostatic force produced by the actuation of the electrode 120. As a result, the electrode 120 actuation range may be broadened to cover most or all of the visible spectrum (wavelength) range of the reflected light.

More specifically, the spring 302 may be configured to provide non-linearity to the restoring force so that the resulting actuation voltage is substantially linear in relation to the visible wavelength range and may be broadened to cover most or all of the visible wavelength range. The spring 302 is shown in states 330, 340, and 350, each state corresponding to a different position of a spring flexible element (e.g., membrane) 304 along a travel trajectory 360. The spring 302 may include one or more stops 310, 312 placed along the length of the spring flexible element 304.

As shown, one end of the spring flexible element 304 may be affixed to an element 320, which may correspond to an anchor of the spring flexible element 304, while the other end of the spring flexible element 304 may be attached to the moveable electrode 130, as shown. The stops 310, 312 may be placed so as to change the effective length of the flexible element 304 along the travel trajectory 360 of the flexible element 304, e.g., when the flexible element 304 moves from state 330 to state 340 to state 350. Shortening of the flexible element 304 along the travel trajectory 360 (using stops 310, 312 or any other shortening technique) may gradually increase the effective spring 302 constant, thus in turn increasing spring stiffness, resulting in gradual increase of the restoring force produced by the spring 320, which may match the electrostatic force produced by the gradual actuation voltage increase applied to the electrode 120. As a result, the actuation range may broaden sufficiently to cover, or substantially cover, the visible wavelength range of the light reflected by the MEMS device 300.

Figure 4:
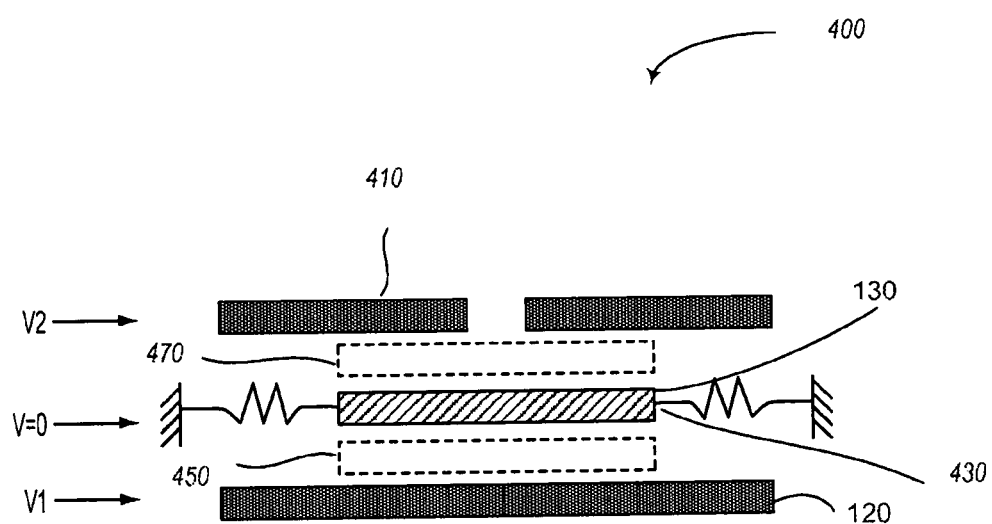
FIG. 4 schematically illustrates another example MEMS device with analog configuration that provides for multi-wavelength light reflection, in accordance with some embodiments.

FIG. 4 schematically illustrates another example MEMS device 400 with analog configuration that provides for multi-wavelength light reflection, in accordance with some embodiments. In some embodiments, in addition to having a single, e.g., bottom electrode 120 to control the location of the movable electrode 130, the MEMS device 400 (hereinafter also called a dual-actuated MEMS device) may include a top electrode 410, similar to electrode 110 described in reference to the tri-stable MEMS device illustrated in FIG. 1. The "rest state" (e.g., start position 430) of the moveable electrode 130 may correspond to represented wavelengths of light in the middle of the visible spectrum. Applying voltage V2 to the top electrode 410 may move the middle moveable electrode 130 up, for example, to a position 470, to reflect longer wavelengths of light. Applying voltage V1 to the bottom electrode 120 may move the moveable electrode 130 down, for example, to a position 450, to reflect shorter wavelengths of light. In this manner, the visible wavelength spectrum may be better represented. Reliability of the MEMS device 400 may also improve since the electrodes 410, 130, and 120 may be designed so as to operate in an approximately linear regime. Reliability of the MEMS device 400 may also improve since the electrodes 410, 130, and 120 may be designed so as to operate in an approximately linear regime and would the system would not reside in the "pulled in condition" where there is a high mechanical stress on the springs.

Figure 5:
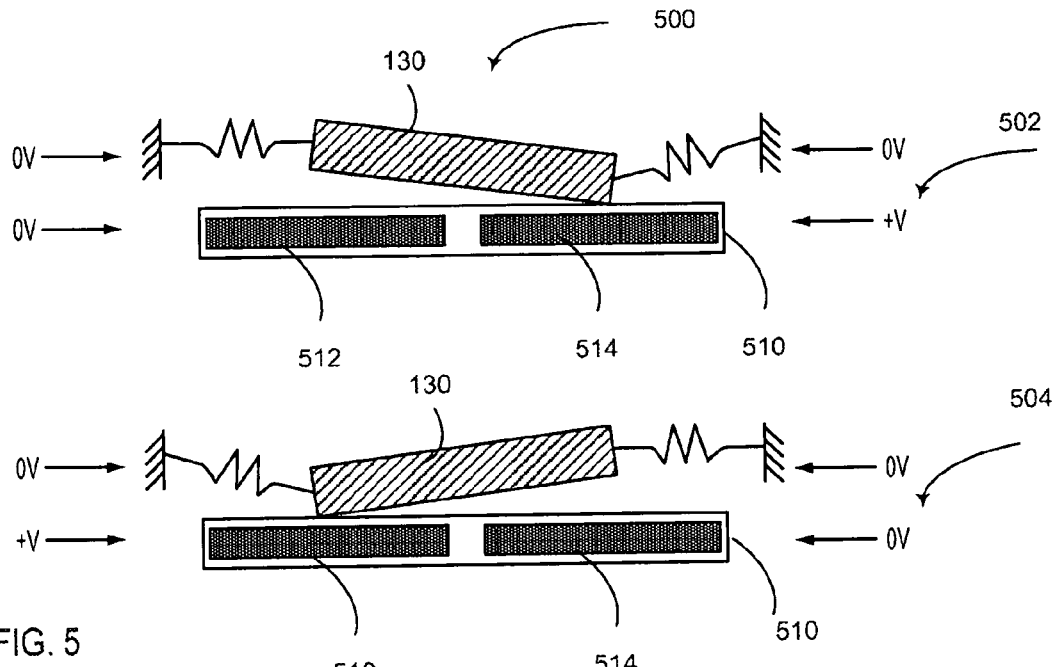
FIGS. 5-6 schematically illustrate example MEMS devices with tiltable movable electrodes configured to provide rendering effects, in accordance with some embodiments.
Figure 6:
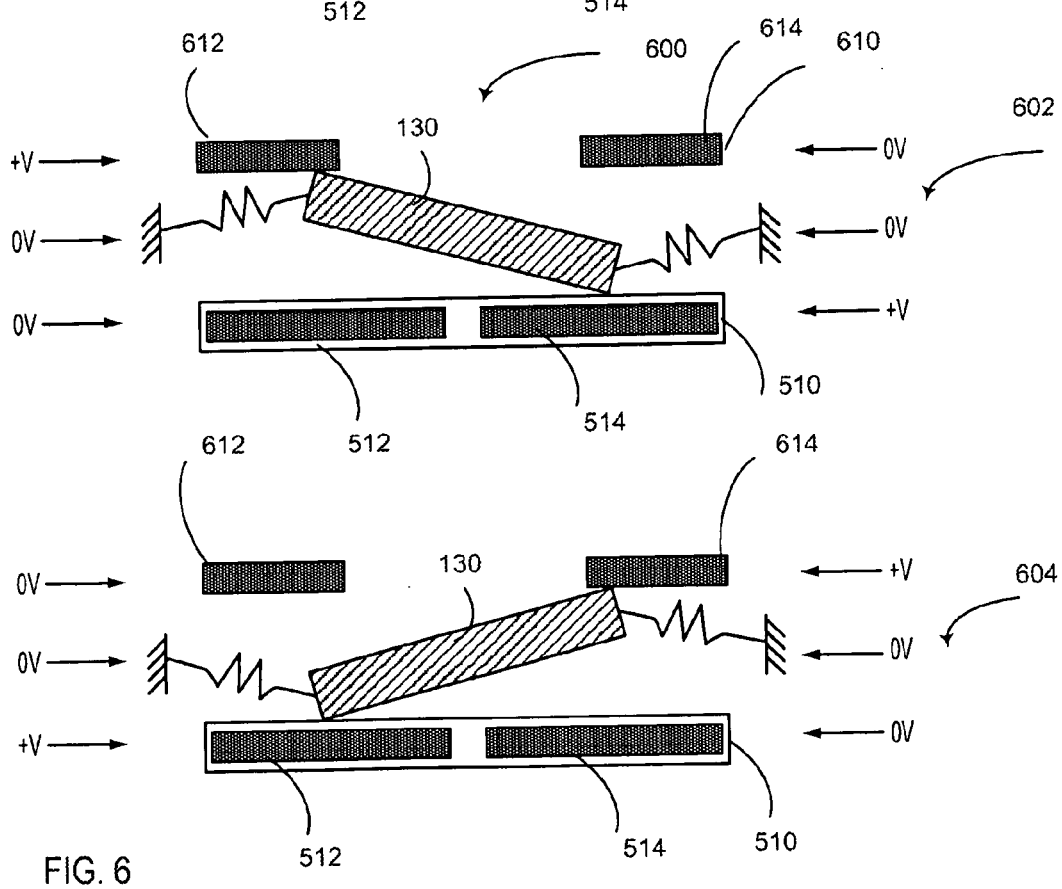

The dual-actuated MEMS device described above may be configured to include additional features which improve the user experience. FIGS. 5-6 schematically illustrate example MEMS devices 500, 600 with tiltable movable electrodes 130 configured to provide rendering effects, in accordance with some embodiments.

In some embodiments, the dual-actuated MEMS device 500 illustrated in FIG. 5 may include a bottom electrode 510 comprising two electrically separate portions (parts) 512 and 514, placed on opposite sides relative to the moveable electrode 130. The two electrically separated parts 512 and 514 may be configured to cause the moveable electrode 130 to tilt toward a selected part 512 or 514, in response to selective application of an actuation voltage to the part. In other words, if actuation voltage is applied selectively to each part, the moveable electrode 130 may tilt accordingly. For example, if actuation voltage is applied to the part 514, the moveable electrode 130 may tilt toward the part 514 as shown in 502. If actuation voltage is applied to the part 512, the moveable electrode 130 may tilt toward the part 512 as shown in 504.

In some embodiments illustrated in FIG. 6, the MEMS device 600 may include, in addition to, or in the alternative to the embodiments described in reference to FIG. 5, a top electrode 610. The top electrode 610 may include two separate parts 612 and 614, similar to the electrode 510 described above. Accordingly, when actuation voltage is applied to the part 612 and to the part 514, the moveable electrode may tilt toward the parts 612 and 514, as shown by 602. When actuation voltage is applied to the part 614 and to the part 512, the moveable electrode may tilt toward the parts 614 and 512, as shown by 604.

Tilting the moveable electrode 130 as described herein may enable a number of rendering effects. For example, if the moveable electrode 130 of the MEMS device described above is tiltable, e.g., to varying angles, the appearance of what is rendered to a display including the MEMS device may change based on the viewer's angle to the screen or due to changes of lighting in the viewer's environment due to the specular and diffuse shading properties of the display. A software application can pass geometric information of a rendered object onto a display including one or more MEMS devices 500 (600), so as to tilt the moveable electrodes 130 according to the geometric parameters. The tilted moveable electrodes may thus "mimic" the object's surface as specified by the application.

Figure 7:
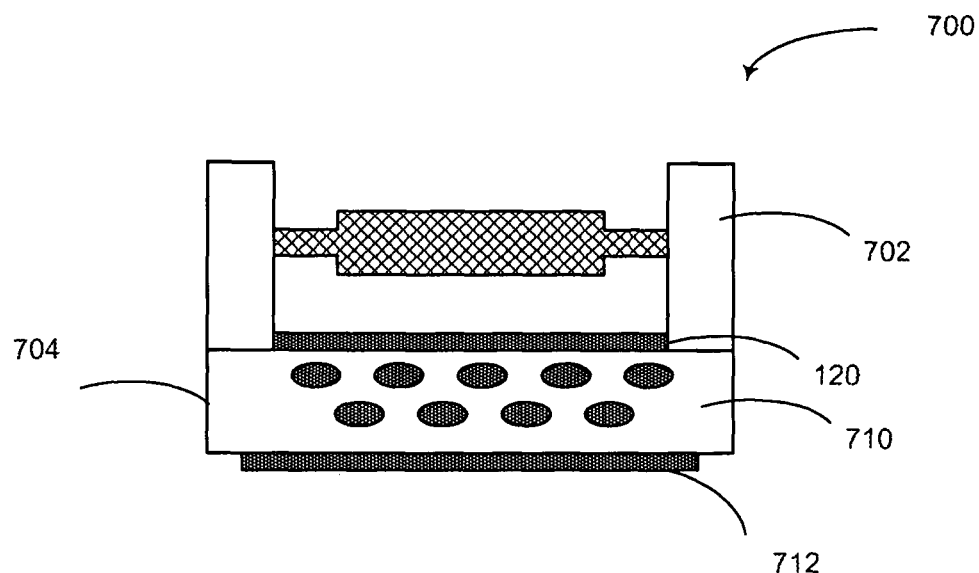
FIGS. 7-8 schematically illustrate example hybrid MEMS devices configured to provide light intensity control, in accordance with some embodiments.
Figure 8:
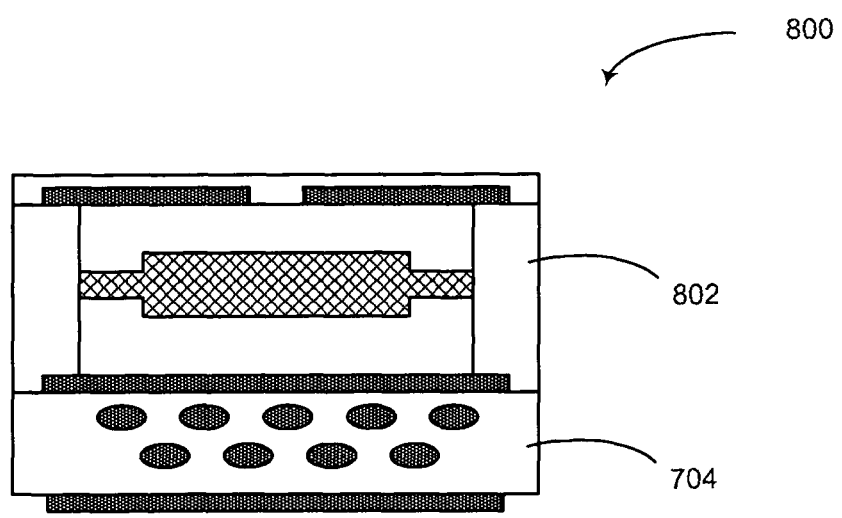

As described above, MEMS devices used in IMOD technologies may be configured to control the wavelength of light reflected on the display. In some embodiments, the MEMS devices may be configured to control the intensity of light, enabling the display to reproduce an image with high fidelity. FIGS. 7-8 schematically illustrate example hybrid MEMS devices 700, 800 configured to provide light intensity control, in accordance with some embodiments.

In some embodiments, the MEMS devices 700 and 800 (hereinafter also called "hybrid MEMS devices") may include embodiments described above and configured to control the wavelength of the reflected light. For example, the MEMS device 700 may include a top portion 702 configured similarly to the embodiments described in reference to FIG. 3. (Like numerals are not shown in the embodiment illustrated in FIG. 7 for simplicity purposes.)

The MEMS device 700 may further include a bottom portion, a reflectance control panel 704 disposed underneath the bottom electrode 120 of the upper portion 702. The reflectance control panel may include a reflective plate 710 and an additional electrode 712 disposed underneath the reflective plate 710 and configured to control reflectance of the reflective plate 710, and accordingly, the intensity of the reflected light. Numerous low-power techniques may be used to control reflectance, including e-ink technology, electrochromic technology, or using a MEMS-like structure. The reflectance control panel 704 may control the intensity of light which is reflected in the display, and the MEMS device 700 may be used to control the wavelength which is reflected.

FIG. 8 illustrates an example hybrid MEMS device 800 having a control panel 704 similar to one described above in reference to FIG. 7, and a top portion 802 configured similarly to the embodiments described in reference to a dual-actuated MEMS device and illustrated in FIG. 4. (Like numerals are not shown in the embodiment illustrated in FIG. 8 for simplicity purposes.) In summary, the hybrid MEMS device 700 (800) may be configured to control the wavelength and the intensity of the reflected light, thus determining both the wavelength and intensity perceived by the user.

In some embodiments, a MEMS device such as analog MEMS device described above may be configured to reduce device power consumption. For example, a spring arrangement including an elastomer spring may be used in a MEMS device instead of a mechanical structure fabricated on the substrate using MEMS microfabrication techniques and described in reference to FIG. 3.

Figure 9:
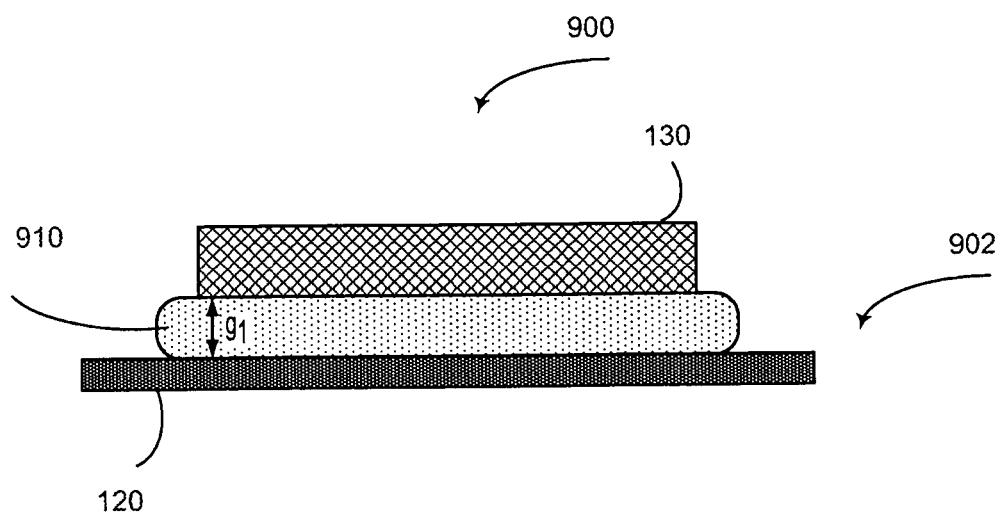
FIG. 9 schematically illustrates example MEMS device with a spring arrangement comprising an elastomer, in accordance with some embodiments.
Figure 9:
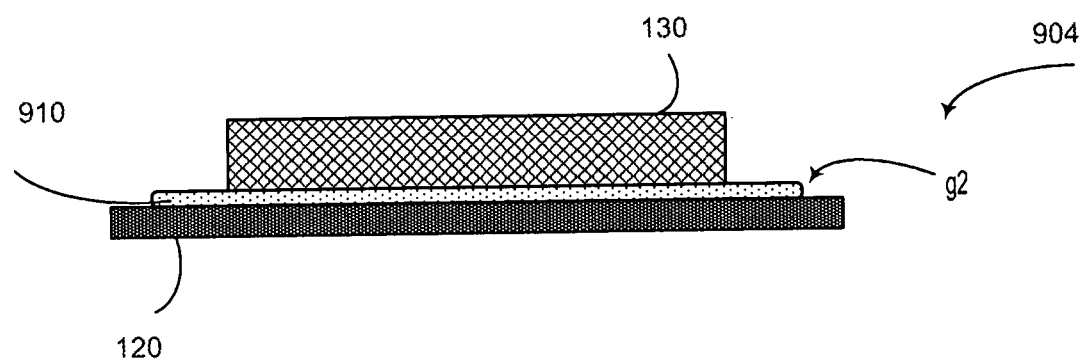

FIG. 9 schematically illustrates example MEMS device 900 with a spring arrangement comprising an elastomer spring, in accordance with some embodiments. The MEMS device 900 is shown in states 902 and 904, described below. The MEMS device 900 may include a moveable electrode (reflective plate) 130 similar to those described above. An elastomer spring 910 may be disposed beneath the moveable electrode 130, as shown in FIG. 9. In some embodiments, the elastomer spring 910 may serve an additional purpose of being the waveguide for the display (e.g., IMOD) in which the MEMS device 900 is disposed.

Different types of elastomers may be used for elastomer spring 910. For example, elastomers such as poly-dimethyl siloxane (PDMS) or other elastic polymer having a low Young's modulus and may be spin-coated and patterned using microfabrication techniques may be used. In operation, when an actuation voltage is applied to a bottom electrode 120, the elastomer spring may provide a resistive force in opposition to the electrostatic force applied to the moveable electrode 130. The moveable electrode may move toward the bottom electrode 120 within a gap defined by a thickness of the elastomer spring (e.g., "g1" shown in state 902 to "g2" shown in state 904).

There may be some advantages to using the elastomer spring 910 in the MEMS device 900. For example, elastomers have a higher permittivity than air, which may increase capacitance and decrease actuation voltage. Elastomers may have a larger index of refraction than air, reducing the gap required to provide constructive interference at a particular wavelength, increasing the capacitance, and decreasing the actuation voltage. Because the force expended per moveable electrode switch is inversely proportional to the square of the actuation voltage, the actuation voltage may be reduced. The energy is proportional to the square of the actuation voltage so the energy requirements for the pixel may also be reduced. The elastomeric spring may be used in the MEMS device embodiments described, for example, in reference to FIG. 3 or 4.

Figure 10:
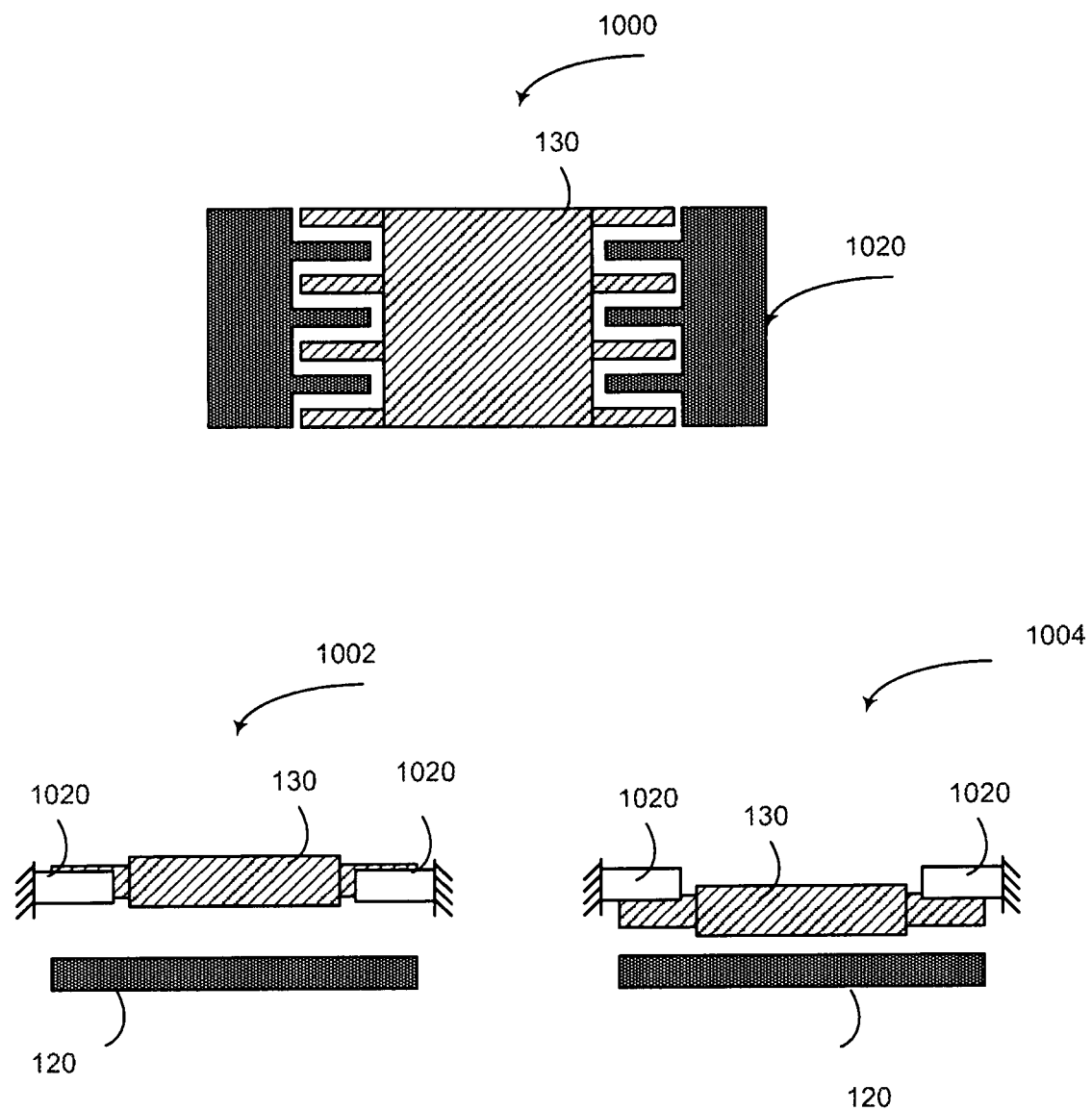
FIG. 10 schematically illustrates an example comb actuator utilized by a MEMS device with analog configuration that provides for multi-wavelength light reflection, in accordance with some embodiments FIG. 11 schematically illustrates an example computing device with a display apparatus including MEMS devices described herein, in accordance with some embodiments.

In some embodiments, particularly ones related to analog MEMS devices similar to one described in reference to FIG. 3, comb actuators may be used to enable analog actuation of the pixel (e.g., an analog MEMS device). Comb actuators may provide linear control of the moveable electrode 130, facilitating the analog actuation of an analog MEMS device. In some embodiments, comb actuations may be used instead of conventional parallel plate actuators. FIG. 10 illustrates a top-down view 1000 and cross-sectional views 1002 and 1004 of a comb actuator 1020 connected to a moveable electrode 130 of a MEMS device similar to one described in reference to FIG. 3. As shown, the analog actuation may be facilitated by the actuator 1020 when the moveable electrode 130 moves down from the position indicated in the view 1002 to the position shown in the view 1004.

Figure 11:
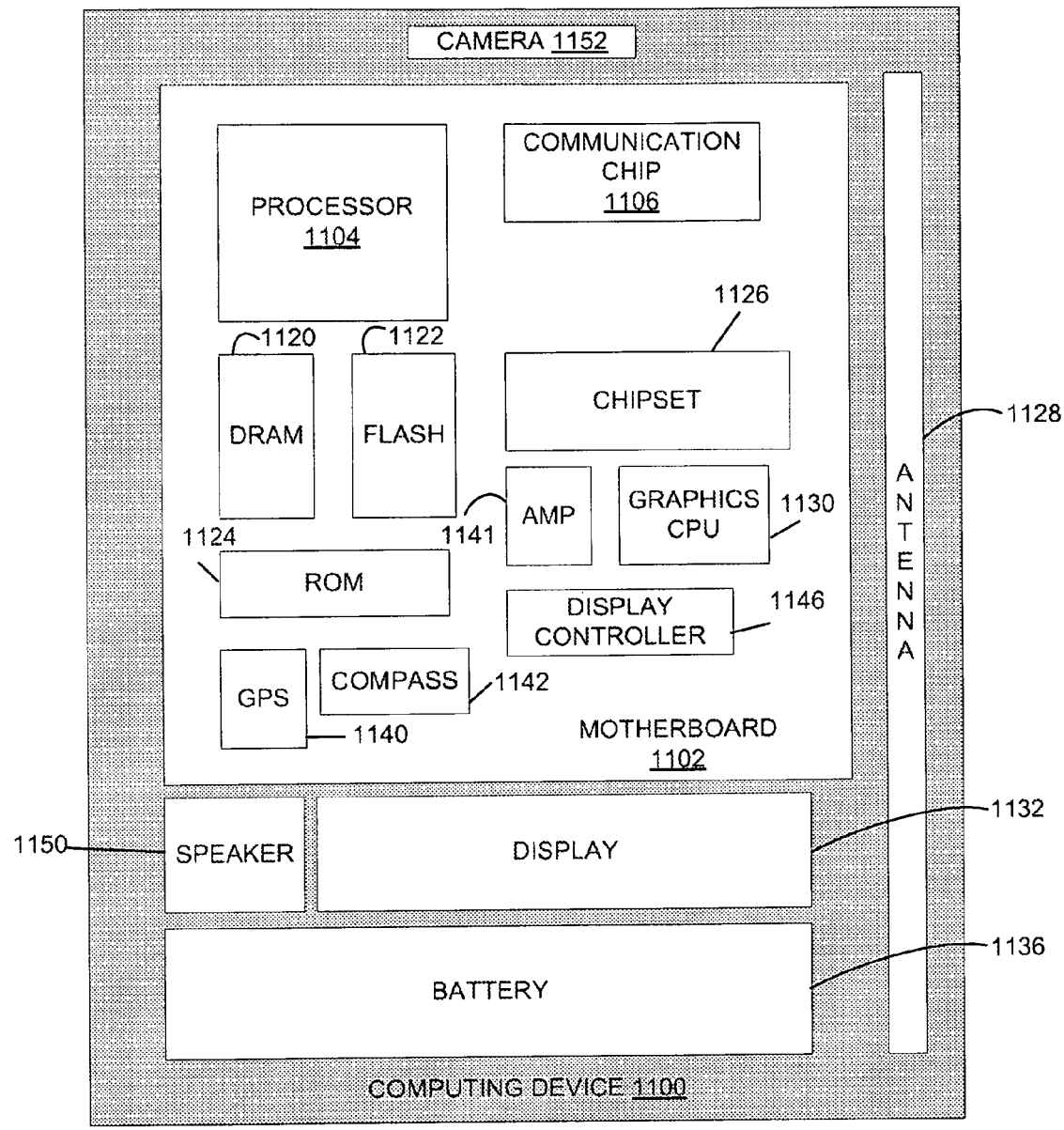

FIG. 11 schematically illustrates a computing device 1100 in accordance with some embodiments. In various embodiments, the device 1100 may have more or less components, and/or different architectures. For example, in some embodiments, the device 1100 may include one or more of a camera, a keyboard, a display such as an IMOD (including a touch screen), a touch screen controller, non-volatile memory port, antenna or multiple antennas, graphics chip, ASIC, speaker(s), a battery, an audio codec, a video codec, a power amplifier, a global positioning system (GPS) device, a compass, an accelerometer, a gyroscope, and the like, as described in greater detail below. In various embodiments, the device 1100 may have more or less components, and/or different architectures. In various embodiments, techniques and configurations described herein may be used in a variety of systems that benefit from the principles described herein such as optoelectronic, electro-optical, MEMS devices and systems, and the like.

The computing device 1100 may house a board such as motherboard 1102. The motherboard 1102 may include a number of components, including but not limited to a processor 1104 and at least one communication chip 1106. The processor 1104 may be physically and electrically coupled to the motherboard 1102. In some implementations, at least one communication chip 1106 may also be physically and electrically coupled to the motherboard 1102. In further implementations, the communication chip 1106 may be part of the processor 1104.

Depending on its applications, computing device 1100 may include other components that may or may not be physically and electrically coupled to the motherboard 1102. These other components may include, but are not limited to, volatile memory (e.g., DRAM) 1120, non-volatile memory (e.g., ROM) 1124, flash memory 1122, a graphics processor 1130, a digital signal processor or a crypto processor (not shown), a chipset 1126, an antenna 1128, a display (e.g., IMOD configured as described herein) 1132, a display controller 1146, a battery 1136, a power amplifier 1141, a global positioning system (GPS) device 1140, a compass 1142, a speaker 1150, a camera 1152, a mass storage device (such as hard disk drive, compact disk (CD), or digital versatile disk (DVD)), an audio codec, a video codec, a Geiger counter, an accelerometer, a gyroscope, (not shown) and so forth.

The communication chip 1106 may enable wireless communications for the transfer of data to and from the computing device 1100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1106 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 1106 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1106 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1106 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 1106 may operate in accordance with other wireless protocols in other embodiments.

The computing device 1100 may include a plurality of communication chips 1106. For instance, a first communication chip 1106 may be dedicated to shorter range wireless communications such as Wi-Fi and Bluetooth and a second communication chip 1106 may be dedicated to longer range wireless communications such as GPS, EDGE, GPRS, CDMA, WiMAX, LTE, Ev-DO, and others.

In various implementations, the computing device 1100 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1100 may be any other electronic device that processes data.

The embodiments described herein may be further illustrated by the following examples. Example 1 is a display apparatus, comprising: one or more micro-electro-mechanical system (MEMS) devices, wherein at least one of the MEMS devices includes: a first electrode including a partially reflective surface; a second electrode including a partially or completely reflective surface and disposed substantially parallel to the first electrode; and an analog actuation arrangement coupled to the first electrode, the second electrode or both the first and second electrodes to cause movement of the first electrode from a start position to a selected one of a plurality of end positions, responsive to a selected application of an actuation voltage, to cause the MEMS device to selectively output a reflection of a light in a selected wavelength, or no reflection of the light.

Example 2 may include the subject matter of Example 1, and further specifies that the display apparatus further comprises an actuation circuit configured to apply the actuation voltage.

Example 3 may include the subject matter of Example 2, and further specifies that the start position corresponds to a first value of the actuation voltage, and the end position corresponds to a second value of the actuation voltage, wherein the first value and the second value define an actuation range of the actuation circuit.

Example 4 may include the subject matter of Example 1, and further specifies that the analog actuation arrangement comprises a spring configured to resist movement of the first electrode away from the start position.

Example 5 may include the subject matter of Example 4, and further specifies the spring is configured to provide a non-linear restoring force in opposition to an electrostatic force applied to move the first electrode away from the start position.

Example 6 may include the subject matter of Example 4, and further specifies the spring is a first spring, and the analog actuation arrangement further includes a second spring, wherein the springs are coupled with respective ends of the first electrode.

Example 7 may include the subject matter of Example 4, and further specifies that the spring includes an elastomer substrate sandwiched between the first and second electrodes, wherein a height of the elastomer substrate defines a gap between the start position of the first electrode and a surface of the second electrode.

Example 8 may include the subject matter of Example 7, and further specifies that the gap between the start position of the first electrode and the surface of the second electrode corresponds to an actuation range of the plurality of end positions.

Example 9 may include the subject matter of Example 1, and further specifies that the analog actuation circuit includes a comb actuator.

Example 10 may include the subject matter of Example 1, and further specifies that the second electrode includes two electrically separated parts, to cause the first electrode to tilt toward a selected of the first or second parts of the second electrode, in response to selective application of an actuation voltage to the first or the second part of the second electrode.

Example 11 may include the subject matter of any of Examples 1 to 10, and further specifies that the MEMS device further includes a reflectance control panel disposed underneath the second electrode, wherein the control panel includes a reflective plate and an additional electrode configured to control reflectance of the reflective plate.

Example 12 is display apparatus, comprising: one or more micro-electro-mechanical system (MEMS) devices, wherein at least one of the one or more MEMS devices includes: a first electrode including a partially reflective surface; a second electrode including a partially or completely reflective surface and disposed on one side of the first electrode, substantially parallel to the first electrode; and a third electrode disposed on an opposite side of the first electrode, substantially parallel to the first electrode; wherein the first electrode is at a start position between the second and third electrodes, when no actuation voltage is applied to either the second or the third electrode, and moveable from the start position to a first or a second position between the second and third electrodes, responsive to selective application of the actuation voltage to either the third or the second electrode, to cause the MEMS device to respective output a first reflection of a light in a first wavelength, a second reflection of the light in a second wavelength, different from the first wavelength, or no reflection of the light.

Example 13 may include the subject matter of Example 12, and further specifies that the display apparatus further comprises an actuation circuit configured to selectively apply the actuation voltage to the second or third electrode, or withhold the actuation voltage from both the second and third electrodes.

Example 14 may include the subject matter of Example 12, and further specifies that the first position of the first electrode is located between the start position and the second electrode, and wherein the second position is located between the start position and the third electrode.

Example 15 may include the subject matter of Example 12, and further specifies that the first electrode in the first position is disposed substantially adjacent to the second electrode, and wherein the first electrode in the second position is disposed substantially adjacent to the third electrode.

Example 16 may include the subject matter of Example 12, and further specifies that the first and second wavelengths correspond to two visible wavelengths of two different colors.

Example 17 may include the subject matter of Example 12, and further specifies that the third electrode comprises a transparent conductive material through which the light passes through to the first and second electrodes.

Example 18 may include the subject matter of Example 12, and further specifies that the third electrode includes a gap through which the light passes through to the first and second electrodes.

Example 19 may include the subject matter of Example 12, and further specifies that the actuation voltage is a first actuation voltage, wherein the second electrode includes two electrically separated first and second parts, to enable the first electrode to tilt toward the first or the second part of the second electrode, in response to selective application of a second actuation voltage to either the first or second part of the second electrode.

Example 20 may include the subject matter of Example 19, and further specifics that the third electrode includes two electrically separated third and fourth parts, wherein the tilting is further responsive to selective application the second actuation voltage to the fourth or third part of the third electrode, corresponding to the first or the second part of the second electrode.

Example 21 may include the subject matter of Example 12, and further specifies that the MEMS device further includes a reflectance control panel disposed underneath the second electrode, wherein the control panel includes a reflective plate and an additional electrode configured to control reflectance of the reflective plate.

Example 22 may include the subject matter of any of Examples 12 to 21, and further specifies that the MEMS device further includes an arrangement configured to provide a restoring force to the first electrode in response to the application of the actuation voltage to the second or third electrode, wherein the restoring force provides a resistance to the movement of the first electrode.

Example 23 is a display apparatus, comprising: one or more micro-electro-mechanical system (MEMS) devices, wherein at least one of the MEMS devices includes: a first electrode means for partially reflecting light, the first means including a partially reflective surface; a second electrode means for reflecting the light, the second means including a partially or completely reflective surface and disposed substantially parallel to the first electrode means; and a means for actuating the first or second means, the means coupled to the first electrode means, the second electrode means or both the first and second electrode means to cause movement of the first electrode means from a start position to a selected one of a plurality of end positions, responsive to a selected application of an actuation voltage, to cause the MEMS device to selectively output a reflection of a light in a selected wavelength, or no reflection of the light.

Example 24 may include the subject matter of Example 23, and further specifies that the means for actuating comprises a spring configured to resist movement of the first electrode means away from the start position.

Example 25 may include the subject matter of Example 24, and further specifies that the spring is configured to provide a non-linear restoring force in opposition to an electrostatic force applied to move the first electrode means away from the start position.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:
1. A display apparatus, comprising:
   one or more micro-electro-mechanical system (MEMS) devices, wherein at least one of the MEMS devices includes:
   a first electrode including a partially reflective surface;
   a second electrode including a partially or completely reflective surface and disposed substantially parallel to the first electrode; and
   an analog actuation arrangement coupled to the first electrode, the second electrode or both the first and second electrodes to cause movement of the first electrode from a start position to a selected one of a plurality of end positions, responsive to a selected application of an actuation voltage, to cause the at least one MEMS device to selectively output a reflection of light in a selected wavelength or no reflection of the light,
   wherein the at least one MEMS device further includes a reflectance control panel disposed underneath the second electrode, wherein the reflectance control panel includes a reflective plate and an additional electrode configured to control reflectance of the reflective plate.

2. The apparatus of claim 1, further comprising an actuation circuit configured to apply the actuation voltage.

3. The apparatus of claim 2, wherein the start position corresponds to a first value of the actuation voltage, and the end position corresponds to a second value of the actuation voltage, wherein the first value and the second value define an actuation range of the actuation circuit.

4. The apparatus of claim 1, wherein the analog actuation arrangement comprises a spring configured to resist movement of the first electrode away from the start position.

5. The apparatus of claim 4, wherein the spring is configured to provide a non-linear restoring force in opposition to an electrostatic force applied to move the first electrode away from the start position.

6. The apparatus of claim 4, wherein the spring is a first spring, and the analog actuation arrangement further includes a second spring, wherein the springs are coupled with respective ends of the first electrode.

7. The apparatus of claim 4, wherein the spring includes an elastomer substrate sandwiched between the first and second electrodes, wherein a height of the elastomer substrate defines a gap between the start position of the first electrode and a surface of the second electrode.

8. The apparatus of claim 7, wherein the gap between the start position of the first electrode and the surface of the second electrode corresponds to an actuation range of the plurality of end positions.

9. The apparatus of claim 1, wherein the analog actuation arrangement includes a comb actuator.

10. The apparatus of claim 1, wherein the second electrode includes two electrically separated parts, to cause the first electrode to tilt toward a selected one of the first or second parts of the second electrode, in response to selective application of an actuation voltage to the first or the second part of the second electrode.

11. A display apparatus, comprising:
one or more micro-electro-mechanical system (MEMS) devices, wherein at least one of the one or more MEMS devices includes:
a first electrode including a partially reflective surface;
a second electrode including a partially or completely reflective surface and disposed on one side of the first electrode, substantially parallel to the first electrode; and
a third electrode disposed on an opposite side of the first electrode, substantially parallel to the first electrode;
wherein the first electrode is at a start position between the second and third electrodes, when no actuation voltage is applied to either the second or the third electrode, and moveable from the start position to a first or a second position between the second and third electrodes, responsive to selective application of the actuation voltage to either the third or the second electrode, to cause the at least one MEMS device to respectively output a first reflection of light in a first wavelength, a second reflection of the light in a second wavelength, different from the first wavelength, or no reflection of the light, and
wherein the at least one MEMS device further includes a reflectance control panel disposed underneath the second electrode, wherein the reflectance control panel includes a reflective plate and an additional electrode configured to control reflectance of the reflective plate.

12. The apparatus of claim 11, further comprising:
an actuation circuit configured to selectively apply the actuation voltage to the second or third electrode, or withhold the actuation voltage from both the second and third electrodes.

13. The apparatus of claim 11, wherein the first position of the first electrode is located between the start position and the second electrode, and wherein the second position is located between the start position and the third electrode.

14. The apparatus of claim 11, wherein the first electrode in the first position is disposed substantially adjacent to the second electrode, and wherein the first electrode in the second position is disposed substantially adjacent to the third electrode.

15. The apparatus of claim 11, wherein the first and second wavelengths correspond to two visible wavelengths of two different colors.

16. The apparatus of claim 11, wherein the third electrode comprises a transparent conductive material through which the light passes through to the first and second electrodes.

17. The apparatus of claim 11, wherein the third electrode includes a gap through which the light passes through to the first and second electrodes.

18. The apparatus of claim 11, wherein the actuation voltage is a first actuation voltage, wherein the second electrode includes two electrically separated first and second parts, to enable the first electrode to tilt toward the first or the second part of the second electrode, in response to selective application of a second actuation voltage to either the first or second part of the second electrode.

19. The apparatus of claim 18, wherein the third electrode includes two electrically separated third and fourth parts, wherein the tilting is further responsive to selective application of the second actuation voltage to the fourth or third part of the third electrode, corresponding to the first or the second part of the second electrode.

20. The apparatus of claim 11, wherein the at least one MEMS device further includes an arrangement configured to provide a restoring force to the first electrode in response to the application of the actuation voltage to the second or third electrode, wherein the restoring force provides a resistance to the movement of the first electrode.

* * * * *